US006736920B2

(12) United States Patent
Kantim

(10) Patent No.: US 6,736,920 B2
(45) Date of Patent: May 18, 2004

(54) METHOD FOR PRODUCING AN ELECTRIC LAMP

(75) Inventor: Uwe Kantim, Niederstotzingen (DE)

(73) Assignee: Patent-Treuhand-Gesellschaft fur elektrische Gluhlampen mbH, Munich (DE)

( * ) Notice: Subject to any disclaimer, the term of this patent is extended or adjusted under 35 U.S.C. 154(b) by 70 days.

(21) Appl. No.: 10/254,910

(22) Filed: Sep. 26, 2002

(65) Prior Publication Data

US 2003/0060115 A1 Mar. 27, 2003

(30) Foreign Application Priority Data

Sep. 26, 2001 (DE) ........................................ 101 47 440

(51) Int. Cl.[7] .......................... B44C 1/17; C04B 41/45; B32B 31/26; F21V 7/22; H01J 61/40

(52) U.S. Cl. ......................... 156/230; 156/63; 156/235; 156/247; 156/289; 156/89.23; 428/914; 427/148; 427/164; 362/255; 362/341; 313/113; 313/635

(58) Field of Search .......................... 156/63, 230, 235, 156/239, 240, 241, 247, 289, 89.11, 89.23, 89.24; 427/146, 147, 148, 162, 164, 165; 428/195, 202, 204, 267, 343, 346, 347, 348, 914; 362/255, 293, 304, 307, 341; 313/634, 635, 113; 445/58

(56) References Cited

U.S. PATENT DOCUMENTS

| | | | | | |
|---|---|---|---|---|---|
| 1,262,395 | A | * | 4/1918 | Schickerling | 362/307 |
| 1,998,967 | A | * | 4/1935 | Raynolds | 313/113 |
| 2,158,561 | A | * | 5/1939 | Biggs | 313/113 |
| 4,142,229 | A | * | 2/1979 | Hulbert, Jr. | 362/292 |
| 4,586,116 | A | * | 4/1986 | Kasboske | 362/293 |
| 5,041,755 | A | * | 8/1991 | Pchelin et al. | 313/25 |
| 5,587,626 | A | * | 12/1996 | Parham et al. | 313/634 |
| 5,990,633 | A | | 11/1999 | Hirschmann et al. | |

* cited by examiner

*Primary Examiner*—J. A. Lorengo
(74) *Attorney, Agent, or Firm*—William E. Meyer

(57) ABSTRACT

The invention relates to a method for producing an electric lamp, in particular the application of an optical shield (5) to a cylindrical part of the lamp vessel (2). According to the invention, the optical shield (5) is applied to the lamp vessel (2) with the aid of at least two prefabricated opaque wax films (5*a*, 5*b*) which are provided with a colored layer and are joined in such a way that the width of the transparent window can be set independently of tolerances of the diameter of the lamp vessel (2). The wax of the films (5*a*, 5*b*) is vaporized by a heat treatment such that only the heat resistant colored layer remains on the lamp vessel (2).

7 Claims, 3 Drawing Sheets

METHOD FOR PRODUCING AN ELECTRIC LAMP

I. TECHNICAL FIELD

Figure 1:
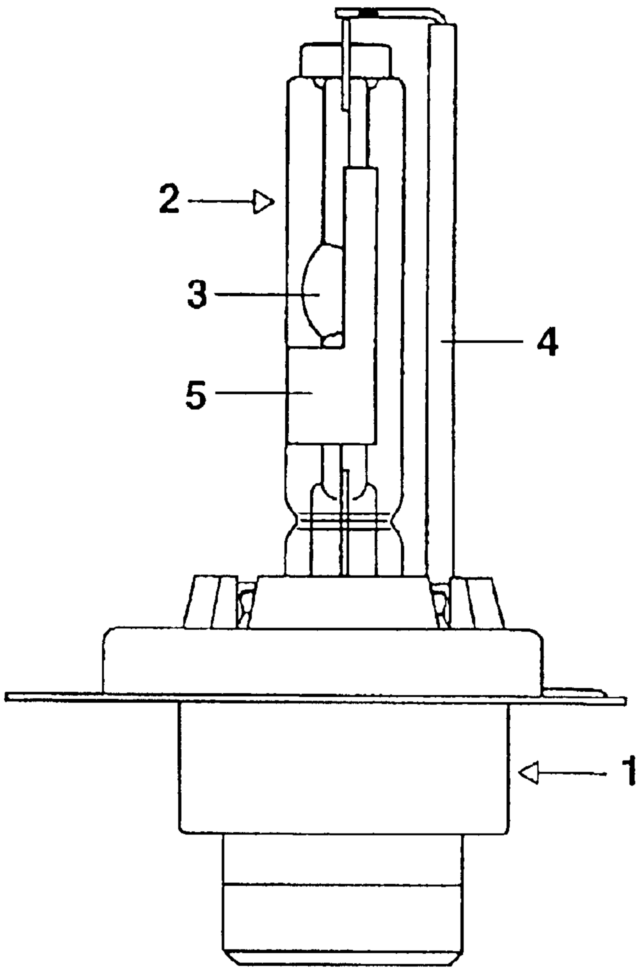

The invention relates to a method for producing an electric lamp in accordance with the preamble of patent claim 1.

II. BACKGROUND ART

Laid-open application WO 98/18297 describes a high-pressure discharge lamp for a motor vehicle headlight, whose cylindrical outer bulb is provided with an auxiliary ignition electrode. The auxiliary ignition electrode is applied to the outer bulb as a strip-shaped metallic coating. This coating can also be configured in such a way that it also acts, in addition, as an optical shield or as a shade. This coating is usually applied to the lamp vessel as a PVD coating or by means of an immersion method.

III. DISCLOSURE OF THE INVENTION

It is the object of the invention to provide a simplified method for applying an optical shield to a cylindrical section of a lamp vessel.

This object is achieved according to the invention by means of the features of patent claim 1. Particularly advantageous designs of the invention are described in the subclaims.

The method according to the invention for producing an electric lamp which has an opaque shield on a cylindrical section of a lamp vessel, the shield being aligned with reference to the luminous means of the lamp, and a transparent window being defined on the cylindrical section of the lamp vessel with a prescribed dimension perpendicular to the cylinder axis, is distinguished in that the shield is produced from at least two prefabricated and preformed opaque films by virtue of the fact that a first prefabricated and preformed opaque film is fixed in a defined position with reference to the luminous means of the lamp on the cylindrical section of the lamp vessel, and a second prefabricated and preformed opaque film is aligned with reference to the first film and fixed in such a way on the cylindrical section of the lamp vessel that the transparent window has the prescribed dimension perpendicular to the cylinder axis.

By contrast with the conventional methods, carrying out the method according to the invention requires no vapor-deposition apparatus for applying the optical shield. Instead, the shield is applied to the cylindrical part of the lamp vessel in the form of at least two prefabricated films. The two films are joined such that the desired form of the optical shield is produced on the lamp vessel. Owing to the assembly of the optical shield from a plurality of films, it is possible to compensate for manufacturing tolerances in the diameter of the cylindrical part of the lamp vessel by placing the films in such a way that they more or less overlap one another, depending on how the diameter deviates from a desired value. This ensures that the transparent window defined by the optical shield always has the same width independently of the manufacturing tolerances of the lamp vessel diameter.

The abovementioned films are advantageously designed as wax films or as films consisting of a wax-like material which are provided with a heat resistant colored layer or have added heat resistant colored pigments. The wax films adhere particularly well to the lamp vessel when they are heated to such an extent that the wax softens. They can then be rolled onto the cylindrical part of the lamp vessel relatively easily. In order to fix the optical shield on the lamp vessel, the lamp vessel with the wax films arranged thereon is subjected to heat treatment such that the wax films vaporize. All that remains on the lamp vessel is the heat resistant colored layer.

In accordance with the preferred exemplary embodiment of the invention, the optical shield is of substantially U-shaped design in order to produce the passing beam in a motor vehicle headlight by means of a high pressure discharge lamp. One U-limb of the shield is applied by means of the first film to the cylindrical section of the lamp vessel, and the other U-limb is applied by means of the second film to the cylindrical section of the lamp vessel. In this case, the U-limbs are aligned parallel to the cylinder axis, and the prescribed dimension of the transparent window perpendicular to the cylinder axis is set by the spacing of the U-limbs.

IV. BRIEF DESCRIPTION OF THE DRAWINGS

Figure 2:
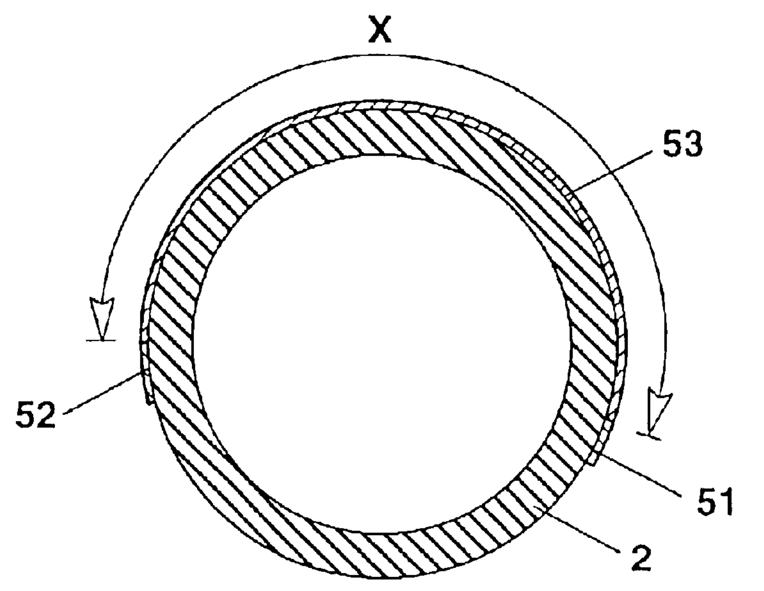
Figure 3:
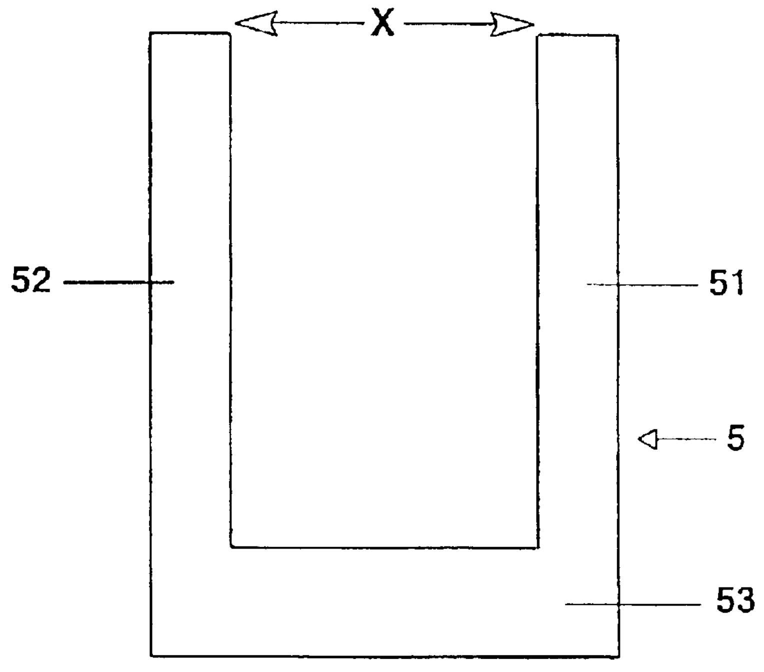
Figure 4:
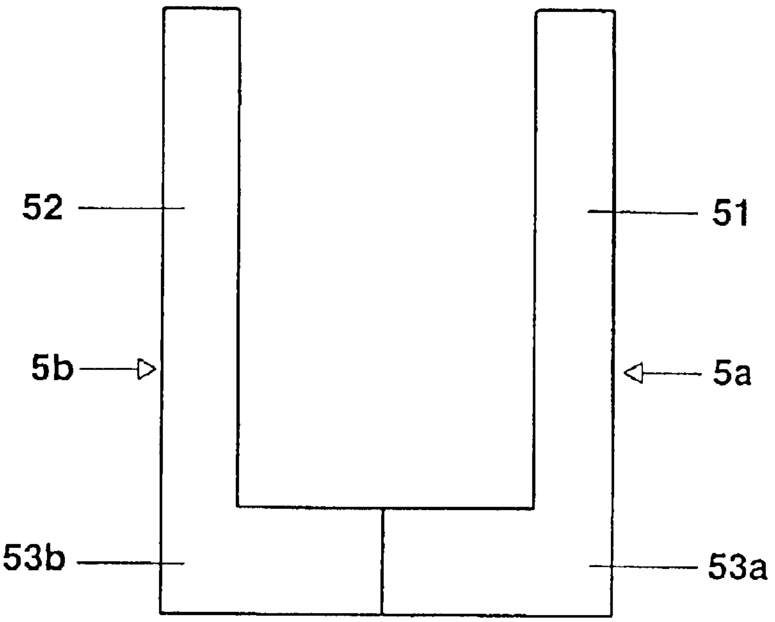
Figure 5:
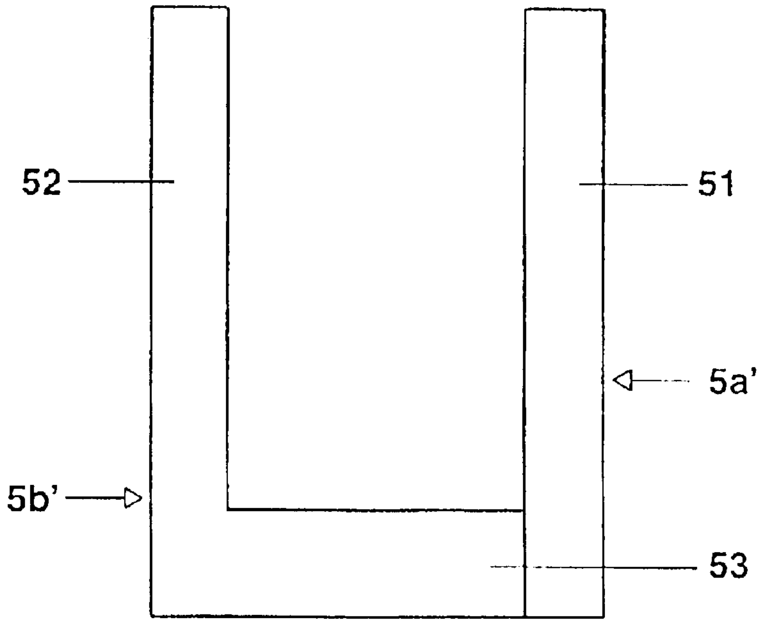

The invention is explained in more detail below with the aid of a plurality of preferred exemplary embodiments. In the drawing:

FIG. 1 shows a side view of a high pressure discharge lamp, having a base at one end, for a motor vehicle headlight, produced using the method according to the invention;

FIG. 2 shows a cross section through the outer bulb of the lamp illustrated in FIG. 1, in the region of the optical shield, FIG. 3 shows the shape of the optical shield, FIG. 4 shows the joining of the optical shield from two mirror-symmetric films in accordance with the first exemplary embodiment, FIG. 5 shows the joining of the optical shield from two differently shaped films in accordance with the second exemplary embodiment.

V. BEST MODE FOR CARRYING OUT THE INVENTION

Illustrated in FIG. 1 is a high pressure discharge lamp, having a base at one end, for a motor vehicle headlight, which has been fabricated using the method according to the invention. This lamp has a plastic base 1 and a discharge vessel 3 enclosed by an outer bulb 2. Two electrodes for producing a light-emitting gas discharge are arranged in the discharge vessel 3. The electrodes are supplied with electric power via supply leads 4. In order to produce a light distribution corresponding to the passing beam, the cylindrically designed outer bulb 2 is provided on its outer surface with an opaque optical shield 5. The optical shield 5 is substantially U-shaped. The spacing X between the two U-limbs 51, 52 defines the width of the transparent window. In order to generate a light distribution corresponding to the passing beam, the width X of the transparent window on the outer surface of the outer bulb 2 must encompass an angle of exactly 195 degrees along its circumference (FIG. 2).

In accordance with the first exemplary embodiment of the invention, the optical shield 5 is produced with the aid of two wax films 5*a*, 5*b* which are formed with mirror-symmetric shape, designed as angles and provided with a colored layer.

The first film 5*a* is aligned with reference to the gas discharge electrodes of the lamp, and fastened on the outer bulb 2. In order to fasten the film 5*a*, it is heated to such an extent that the wax of the film 5*a* softens. As a result, the film 5*a* adheres to the outer bulb 2 without the use of adhesives. The second wax film 5*b* is aligned on the first film 5*a* and fixed on the outer bulb 2 in the same way as the film 5*a*, such that the width X of the transparent window or the spacing between U-limbs 51, 52 is exactly 195 degrees along the circumference of the outer bulb 2, specifically independently of the outside diameter of the outer bulb 2. This is ensured by virtue of the fact that the sections 53*a*, 53*b* of the films 5*a*, 5*b* are arranged in a more or less overlapping fashion in accordance with the deviation of the outer bulb diameter from its desired value. Subsequently, the lamp with the wax foils fixed on the outer bulb 2 is heated so strongly that the wax of the films 5*a*, 5*b* vaporizes and only the heat resistant colored layer of the films 5*a*, 5*b* remains on the outer bulb 2. The colored layer consists of carbonyl iron which usually is also used for blackening the domes of H4 and H7 lamps, since carbonyl iron has a high heat resistance. However, instead of carbonyl iron it is also possible to use paints which are customary for decorating ceramic vessels.

In accordance with the second exemplary embodiment according to the invention, the shield 5 is produced from two differently formed wax films 5*a'*, 5*b'*. The first wax film 5*a'* is designed as a web, and the second wax film 5*b'* is designed as an angle. These two films 5*a'* and 5*b'* are arranged more or less overlapping in the region 53, in order to ensure the prescribed width X of the transparent window on the outer bulb 2 independently of a diameter thereof. The method in accordance with the second exemplary embodiment corresponds to the first one in all other details.

All other fabrication processes of the lamp are prior art and therefore need not be explained in more detail here. The invention is not limited to the exemplary embodiments explained in more detail above. Instead of wax films, it is also possible for the purpose of carrying out the method according to the invention to use films which have a substrate material on which a wax layer or an adhesive layer is arranged, a heat resistant colored layer being arranged, in turn, on the wax layer or the adhesive layer. A paper strip, for example, is suitable as substrate material. These films are heated for the purpose of improving their adhesion to the lamp vessel, and are pressed in the heated state with the colored layer surface against the lamp vessel. The heating also has the effect of detaching the substrate material from the wax layer or adhesive layer. Subsequently, the substrate material is peeled from the lamp vessel, and thereafter a heat treatment is used to vaporize or remove the wax layer or adhesive layer, and to burn the colored layer into the lamp vessel.

What is claimed is:

1. A method for producing an electric lamp which has an opaque shield on a cylindrical section of a lamp vessel, the shield being aligned with reference to the luminous means of the lamp, and defining a transparent window on the cylindrical section of the lamp vessel with a prescribed dimension perpendicular to the cylinder axis, characterized in that the shield is produced from at least two prefabricated and preformed opaque films, wherein a first prefabricated and preformed opaque film is fixed in a defined position with reference to the luminous means of the lamp on the cylindrical section of the lamp vessel, and a second prefabricated and preformed opaque film is aligned with reference to the first film and fixed in such a way on the cylindrical section of the lamp vessel that the transparent window has the prescribed dimension perpendicular to the cylinder axis.

2. The method as claimed in claim 1, wherein the films are designed as wax films or as films consisting of a wax-like material which are provided with a heat resistant colored layer, or which have added heat resistant colored pigments.

3. The method as claimed in claim 2, wherein the wax films are heated before the application to the lamp vessel to such an extent that they adhere to the lamp vessel.

4. The method as claimed in claim 2, wherein the lamp vessel with the films arranged thereon is subjected to heat treatment such that the wax of the films vaporizes.

5. The method as claimed in claim 1, wherein the films have a substrate material on which a wax layer or an adhesive layer is arranged, a heat resistant colored layer being arranged on the wax layer or the adhesive layer.

6. The method as claimed in claim 5, wherein the films are heated for the purpose of improving their adhesion to the lamp vessel and are pressed in the heated state with the colored layer surface against the lamp vessel, the substrate material is subsequently peeled from the lamp vessel and the wax or adhesive layer is subsequently removed by means of a heat treatment, and the colored layer is burnt into the lamp vessel.

7. The method as claimed in claim 1, wherein the shield is substantially of U-shaped design, one U-limb of the shield is applied by means of the first film to the cylindrical section of the lamp vessel, and the other U-limb is applied by means of the second film to the cylindrical section of the lamp vessel, the U-limbs being aligned parallel to the cylinder axis, and the prescribed dimension of the transparent window perpendicular to the cylinder axis being set by the spacing of the U-limbs.

* * * * *